(12) United States Patent
Hosoya (10) Patent No.: US 11,970,176 B2
(45) Date of Patent: Apr. 30, 2024

(54) ABNORMALITY DETERMINATION DEVICE, ABNORMALITY DETERMINATION METHOD, VEHICLE STATE ESTIMATION DEVICE, AND NON-TRANSITORY COMPUTER-READABLE STORAGE MEDIUM

(71) Applicant: HONDA MOTOR CO., LTD., Tokyo (JP)

(72) Inventor: Tomoyuki Hosoya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/562,074

(22) Filed: Dec. 27, 2021

(65) Prior Publication Data

US 2022/0204002 A1 Jun. 30, 2022

(30) Foreign Application Priority Data

Dec. 28, 2020 (JP) .................................. 2020-219378

(51) Int. Cl.
*B60W 50/02* (2012.01)
*B60W 40/107* (2012.01)
(Continued)

(52) U.S. Cl.
CPC ...... *B60W 50/0205* (2013.01); *B60W 40/107* (2013.01); *B60W 40/109* (2013.01);
(Continued)

(58) Field of Classification Search
CPC .......... B60W 50/0205; B60W 40/107; B60W 40/109; B60W 40/11; B60W 40/112;
(Continued)

(56) References Cited

U.S. PATENT DOCUMENTS 9,623,851 B1 * 4/2017 Cymbal ................ B60T 8/1766
2018/0362010 A1 * 12/2018 Yildirim ................. B60Q 9/00
(Continued)

FOREIGN PATENT DOCUMENTS

JP 6663006 B2 3/2020

*Primary Examiner* — Jaime Figueroa
*Assistant Examiner* — Mohamad O El Sayah
(74) *Attorney, Agent, or Firm* — Armstrong Teasdale LLP (57) ABSTRACT

In an abnormality determination device for determining presence or absence of an abnormality of a 6-axis inertial measurement sensor installed in a vehicle to detect a forward-backward acceleration, a lateral acceleration, a vertical acceleration, a roll rate, a pitch rate, and a yaw rate of the vehicle, the abnormality determination device includes: a 3-axis inertial measurement sensor that detects the forward-backward acceleration, the lateral acceleration, and the yaw rate; and an abnormality determination unit that determines presence or absence of an abnormality of the 6-axis inertial measurement sensor, wherein the abnormality determination unit determines the presence or absence of an abnormality of the 6-axis inertial measurement sensor by comparing the forward-backward acceleration, the lateral acceleration, and the yaw rate acquired by the 6-axis inertial measurement sensor with the forward-backward acceleration, the lateral acceleration, and the yaw rate acquired by the 3-axis inertial measurement sensor, respectively.

2 Claims, 4 Drawing Sheets

(51) Int. Cl.
*B60W 40/109* (2012.01)
*B60W 40/11* (2012.01)
*B60W 40/112* (2012.01)
*B60W 40/114* (2012.01)
*G05D 1/00* (2024.01)

(52) U.S. Cl.
CPC ........... *B60W 40/11* (2013.01); *B60W 40/112* (2013.01); *B60W 40/114* (2013.01); *G05D 1/027* (2013.01); *B60W 2050/0215* (2013.01); *B60W 2520/16* (2013.01); *B60W 2520/26* (2013.01); *B60W 2520/28* (2013.01)

(58) Field of Classification Search
CPC ....... B60W 40/114; B60W 2050/0215; B60W 2520/16; B60W 2520/26; B60W 2520/28; G05D 1/027
See application file for complete search history.

(56) References Cited

U.S. PATENT DOCUMENTS

| | | | |
|---|---|---|---|
| 2019/0186920 A1* | 6/2019 | Leach | G01C 21/1652 |
| 2021/0123754 A1* | 4/2021 | Mordechai | G05D 1/027 |
| 2021/0149020 A1* | 5/2021 | Pinnock | G01S 13/86 |

* cited by examiner

ABNORMALITY DETERMINATION DEVICE, ABNORMALITY DETERMINATION METHOD, VEHICLE STATE ESTIMATION DEVICE, AND NON-TRANSITORY COMPUTER-READABLE STORAGE MEDIUM

TECHNICAL FIELD

The present invention relates to an abnormality determination device, an abnormality determination method, and an abnormality determination program (stored in a non-transitory computer-readable storage medium) for determining presence or absence of an abnormality of an inertial measurement sensor for measuring an acceleration and an angular velocity, particularly of a 6-axis inertial measurement sensor used in estimation of a velocity and an attitude angle of a vehicle. The present invention also relates to a vehicle state estimation device for estimating a vehicle state based on the measured values obtained by the 6-axis inertial measurement sensor.

BACKGROUND ART

There is known a vehicle motion detecting apparatus for detecting a motion of a vehicle, which includes a motion detecting section that detects a motion of the vehicle and a malfunction (abnormality) detecting section for detecting a malfunction of the motion detecting section (for example, JP6663006B2).

The motion detecting section includes a 6-axis inertial sensor. The 6-axis inertial sensor detects accelerations in the fore and aft direction (longitudinal direction), the lateral direction, and the vertical direction of the vehicle as well as a roll rate, a pitch rate, and a yaw rate.

The malfunction detecting section includes a 3-axis inertial sensor, a wheel speed sensor, and a pressure sensor. The 3-axis inertial sensor detects accelerations in the vertical and lateral directions of the vehicle and a roll rate. The wheel speed sensor measures wheel speeds of at least two wheels, and the malfunction detecting section detects the forward-backward (longitudinal) acceleration based on the measured wheel speeds. The pressure sensor measures brake fluid pressures of the front and rear wheels, and the malfunction detecting section detects a yaw rate based on the measured brake fluid pressures.

The malfunction detecting section compares the vertical acceleration, the lateral acceleration, and the roll rate of the vehicle obtained by the 6-axis inertial sensor in the motion detecting section with the vertical acceleration, the lateral acceleration, and, the roll rate of the vehicle obtained by the 3-axis inertial sensor, respectively. Further, the malfunction detecting section compares the forward-backward acceleration and the yaw rate of the vehicle obtained by the 6-axis inertial sensor in the motion detecting section with the forward-backward acceleration detected based on the wheel speed and the yaw rate detected based on the brake fluid pressure. The malfunction detecting section determines that there is a malfunction (abnormality) in the 6-axis inertial sensor when there is a predetermined mismatch between the corresponding detected values.

In an autonomous vehicle which can travel autonomously, to accurately identify the position of the own vehicle, it is particularly necessary to properly determine an abnormality of a sensor for detecting the forward-backward acceleration of the vehicle. Since the malfunction detecting section of JP6663006B2 detects the forward-backward acceleration based on the wheel speeds, when the wheels are slipping, the forward-backward acceleration detected based on the wheel speeds deviate from the true value, and accordingly the malfunction detecting section may incorrectly determine that there is a malfunction (abnormality) in the 6-axis inertial sensor.

SUMMARY OF THE INVENTION

In view of the foregoing background, a primary object of the present invention is to provide an abnormality determination device, an abnormality determination method, an abnormality determination program (stored in a non-transitory computer-readable storage medium), and a vehicle state estimation device which can properly determine an abnormality of a 6-axis inertial measurement sensor that acquires a forward-backward acceleration, a lateral acceleration, a vertical acceleration, a roll rate, a pitch rate, and a yaw rate of the vehicle.

To achieve the above object, one aspect of the present invention provides an abnormality determination device for determining presence or absence of an abnormality of a 6-axis inertial measurement sensor (5) installed in a vehicle (S) to detect a forward-backward acceleration, a lateral acceleration, a vertical acceleration, a roll rate, a pitch rate, and a yaw rate of the vehicle, the abnormality determination device comprising: a 3-axis inertial measurement sensor (7) that detects the forward-backward acceleration, the lateral acceleration, and the yaw rate; and an abnormality determination unit that determines presence or absence of an abnormality of the 6-axis inertial measurement sensor, wherein the abnormality determination unit determines the presence or absence of an abnormality of the 6-axis inertial measurement sensor by comparing the forward-backward acceleration, the lateral acceleration, and the yaw rate acquired by the 6-axis inertial measurement sensor with the forward-backward acceleration, the lateral acceleration, and the yaw rate acquired by the 3-axis inertial measurement sensor, respectively.

According to this aspect, presence or absence of an abnormality of the 6-axis inertial measurement sensor can be determined by comparing the forward-backward acceleration of the vehicle acquired by the 6-axis inertial sensor with the forward-backward acceleration of the vehicle acquired by the 3-axis inertial sensor. Thereby, even when the wheel is slipping, an abnormality of the 6-axis inertial sensor in detection of the forward-backward acceleration can be determined properly.

To achieve the above object, another aspect of the present invention provides an abnormality determination method for determining presence or absence of an abnormality of a 6-axis inertial measurement sensor (5) installed in a vehicle (S) to detect a forward-backward acceleration, a lateral acceleration, a vertical acceleration, a roll rate, a pitch rate, and a yaw rate of the vehicle, the method comprising: acquiring the forward-backward acceleration, the lateral acceleration, and the yaw rate from a 3-axis inertial measurement sensor (7) installed in the vehicle to detect the forward-backward acceleration, the lateral acceleration, and the yaw rate; and determining the presence or absence of an abnormality of the 6-axis inertial measurement sensor by comparing the forward-backward acceleration, the lateral acceleration, and the yaw rate acquired by the 6-axis inertial measurement sensor with the forward-backward acceleration, the lateral acceleration, and the yaw rate acquired by the 3-axis inertial measurement sensor, respectively.

According to this aspect, presence or absence of an abnormality of the 6-axis inertial measurement sensor can be determined by comparing the forward-backward acceleration of the vehicle acquired by the 6-axis inertial sensor with the forward-backward acceleration of the vehicle acquired by the 3-axis inertial sensor. Thereby, in contrast to the case where the wheel speed is used, even when the wheel is slipping, an abnormality of the 6-axis inertial sensor in detection of the forward-backward acceleration can be determined properly.

To achieve the above object, another aspect of the present invention provides a non-transitory computer-readable storage medium, comprising a stored program, wherein the program, when executed by a processor, executes the aforementioned abnormality determination method.

According to this aspect, presence or absence of an abnormality of the 6-axis inertial measurement sensor can be determined by comparing the forward-backward acceleration of the vehicle acquired by the 6-axis inertial sensor with the forward-backward acceleration of the vehicle acquired by the 3-axis inertial sensor. Thereby, in contrast to the case where the wheel speed is used, even when the wheel is slipping, an abnormality of the 6-axis inertial sensor in detection of the forward-backward acceleration can be determined properly.

To achieve the above object, another aspect of the present invention provides a vehicle state estimation device (46) for estimating a vehicle state based on measured values acquired by a 6-axis inertial measurement sensor (5) installed in a vehicle (S) to detect a forward-backward acceleration, a lateral acceleration, a vertical acceleration, a roll rate, a pitch rate, and a yaw rate of the vehicle, the vehicle state estimation device comprising: a 3-axis inertial measurement sensor (7) that detects the forward-backward acceleration, the lateral acceleration, and the yaw rate; and an abnormality determination unit (31) that determines presence or absence of an abnormality of the 6-axis inertial measurement sensor, wherein the abnormality determination unit determines the presence or absence of an abnormality of the 6-axis inertial measurement sensor by comparing the forward-backward acceleration, the lateral acceleration, and the yaw rate acquired by the 6-axis inertial measurement sensor with the forward-backward acceleration, the lateral acceleration, and the yaw rate acquired by the 3-axis inertial measurement sensor, respectively.

According to this aspect, presence or absence of an abnormality of the 6-axis inertial measurement sensor can be determined by comparing the forward-backward acceleration of the vehicle acquired by the 6-axis inertial sensor with the forward-backward acceleration of the vehicle acquired by the 3-axis inertial sensor. Thereby, in contrast to the case where the wheel speed is used, even when the wheel is slipping, an abnormality of the 6-axis inertial sensor in detection of the forward-backward acceleration can be determined properly.

In the above aspect, preferably, preferably, vehicle state estimation device comprises a wheel speed sensor (9) that measures a wheel speed of a wheel provided on the vehicle and a vehicle state estimation unit (31) that calculates an attitude angle of the vehicle based on the measured values measured by the wheel speed sensor and the 6-axis inertial measurement sensor, wherein the abnormality determination unit determines that there is an abnormality in the 6-axis inertial measurement sensor or the wheel speed sensor when a difference between the attitude angle calculated by the vehicle state estimation unit and a steady-state attitude angle based on a direction of gravity calculated by using the wheel speed when the vehicle travels without slipping of the wheel becomes greater than or equal to a prescribed threshold value.

According to this aspect, the attitude angle calculated by performing integral operation and the steady-state attitude angle are obtained, and therefore, by calculating a difference therebetween, an abnormality of the 6-axis inertial measurement sensor and/or the wheel speed sensor can be detected.

In the above aspect, preferably, preferably, the abnormality determination unit determines that there is an abnormality in the 6-axis inertial measurement sensor or the wheel speed sensor when a difference between a roll angle calculated by the vehicle state estimation unit and a roll angle of the steady-state attitude angle is greater than or equal to a prescribed threshold value or when a difference between a pitch angle calculated by the vehicle state estimation unit and a pitch angle of the steady-state attitude angle is greater than or equal to a prescribed threshold value.

According to this aspect, it is possible to detect an abnormality of the 6-axis inertial measurement sensor in the roll direction and the pitch direction and an abnormality of the wheel speed sensor.

According to the foregoing configuration, it is possible to provide an abnormality determination device, an abnormality determination method, an abnormality determination program (stored in a non-transitory computer-readable storage medium), and, a vehicle state estimation device which can properly determine an abnormality of the 6-axis inertial measurement sensor that acquires a forward-backward acceleration, a lateral acceleration, a vertical acceleration, a roll rate, a pitch rate, and a yaw rate of the vehicle.

DESCRIPTION OF THE PREFERRED
EMBODIMENT(S)

In the following, an embodiment in which an abnormality determination device, an abnormality determination method, an abnormality determination program (stored in a non-transitory computer-readable storage medium), and a vehicle state estimation device according to the present invention are applied to a vehicle S which is capable of travelling autonomously will be described with reference to the drawings.

The abnormality determination device, abnormality determination method, abnormality determination program, and vehicle state estimation device according to the embodiment are provided in the vehicle S which is capable of traveling autonomously.

Figure 1:
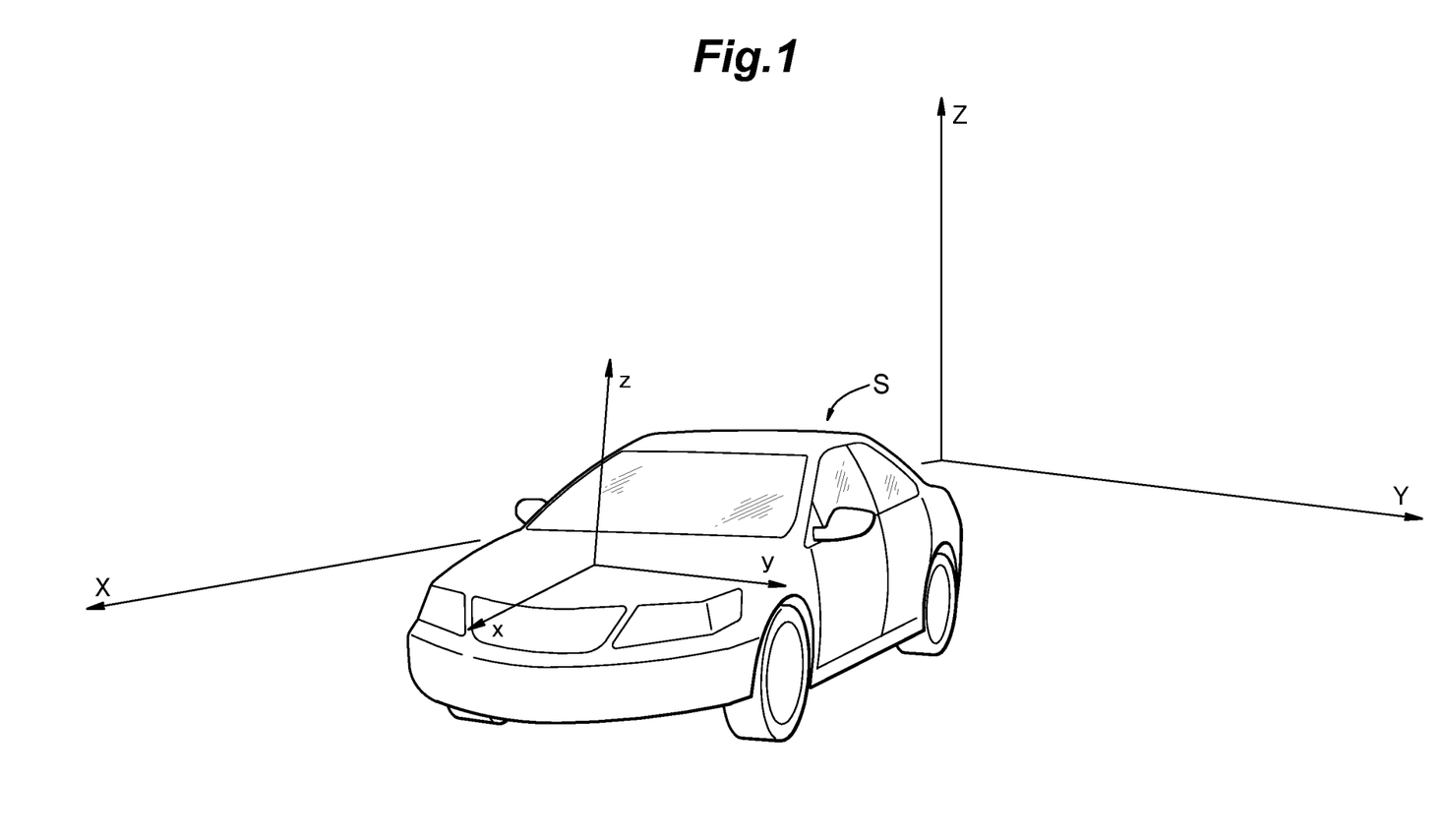
FIG. 1 is a perspective view of a vehicle in which a vehicle state estimation device according to an embodiment of the present invention is installed.

In the following, for convenience of explanation, a coordinate system fixed to the road surface to have an X axis and a Y axis extending horizontally in mutually orthogonal two directions and a Z axis extending vertically upward as shown in FIG. 1 will be referred to as a fixed coordinate system (also referred to as an inertial coordinate system).

Figure 2:
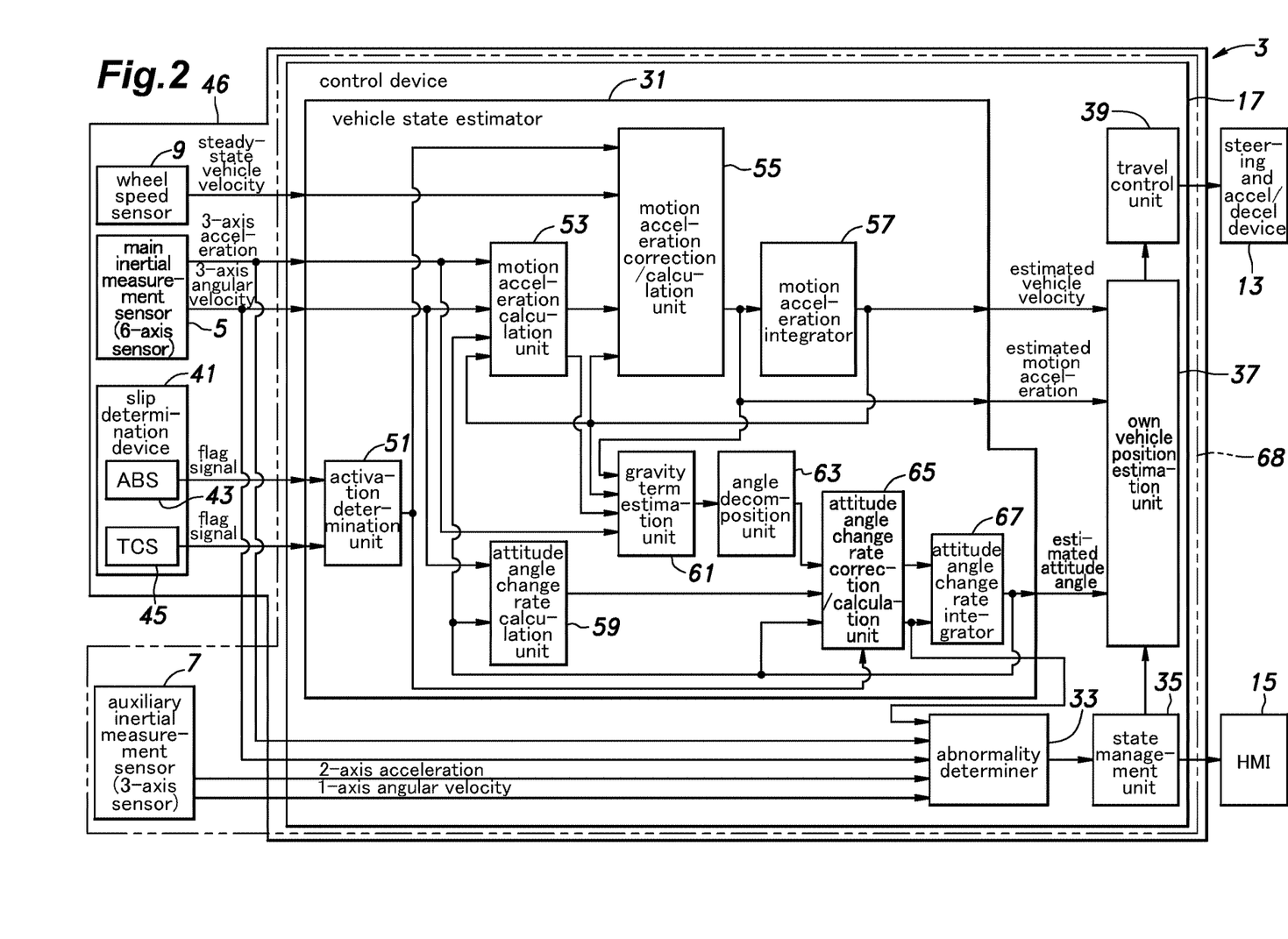
FIG. 2 is a functional configuration diagram of the vehicle state estimation device.

As shown in FIG. 2, the vehicle S is provided with a vehicle control system 3 for controlling the behavior of the vehicle S to make the vehicle S travel autonomously. The vehicle control system 3 includes two inertial measurement sensors 5, 7, a wheel speed sensor 9, an external environment recognition device (not shown in the drawings), a steering and acceleration/deceleration device 13, a human machine interface (HMI) 15, and a control device 17.

The inertial measurement sensors 5, 7 are each fixed to the vehicle body. One of the inertial measurement sensors 5, 7 (in the present embodiment, a main inertial measurement sensor 5) is a so-called 6-axis inertial measurement sensor and detects an acceleration $G_{sens}$ along three axes and an angular velocity ω about the three axes.

The main inertial measurement sensor 5 measures the acceleration $G_{sens}$. The main inertial measurement sensor 5 outputs the acceleration $G_{sens}$ with respect to a coordinate system having an x axis, a y axis, and a z axis and fixed to the main inertial measurement sensor 5 (namely, fixed to the vehicle body). Hereinafter, this coordinate system will be referred to as an acceleration coordinate system. Note that the main inertial measurement sensor 5 is fixed to the vehicle body such that the positive direction of the x axis coincides with the forward direction of the vehicle body, the positive direction of the y axis coincides with the leftward direction of the vehicle body, and the positive direction of the z axis coincides with the upward direction of the vehicle body. Namely, the x axis is set to extend in the fore and aft direction of the vehicle body, the y axis is set to extend in the lateral direction of the vehicle body, and the z axis is set to extend in the vertical direction of the vehicle body. In the following, for convenience of explanation, the origin of the acceleration coordinate system is at the position where the main inertial measurement sensor 5 is provided.

In the present embodiment, the main inertial measurement sensor 5 includes three housings held by the vehicle body and each having a detection electrode. Each housing has a weight accommodated therein such that the weight is held in the housing via two springs in one of the x axis, the y axis, and the z axis directions. The main inertial measurement sensor 5 measures an inertial force applied to each weight by detecting a change in electrostatic capacitance between the weight and the corresponding detection electrode, divides the inertial force by the mass of the weight, and reverses the direction (or sign) of the value obtained by the division, thereby to calculate the acceleration, which is output. Note that the main inertial measurement sensor 5 is not limited to this configuration, and may be embodied by using a piezoelectric element, for example, which generates a voltage in accordance with a deformation when deformed by an inertial force. In this case, the main inertial measurement sensor 5 may acquire the inertial force by detecting the voltage generated by the piezoelectric element, and calculate and output the acceleration based on the inertial force.

Provided that the x component, the y component, and the z component of the acceleration $G_{sens}$ output from the main inertial measurement sensor 5 are denoted by $G_{sensx}$, $G_{sensy}$, $G_{sensz}$, respectively, an acceleration G acting on the vehicle S in the fixed coordinate system (G=ΣF/m, where ΣF indicates a total sum of the forces, excluding gravity, that act on the vehicle S, and m indicates the mass of the vehicle S) satisfies the following formula (1):

$$G_{sens} + G_v = G_{sensx}i + G_{sensy}j + G_{sensz}k + G_v = G\left(=\frac{\sum F}{m}\right) \quad (1)$$

Note that, i, j, and k represent unit vectors in the x axis, y axis, and z axis directions, respectively, in the acceleration coordinate system, and Gv represents the gravitational acceleration. The formula (1) indicates that the acceleration $G_{sens}$ measured by the main inertial measurement sensor 5 deviates from the acceleration G acting on the vehicle S due to the influence of the gravitational acceleration Gv ($G_{sens}$=G−Gv), and it is therefore necessary to correct the acceleration $G_{sens}$ measured by the main inertial measurement sensor 5 taking into account the influence of the gravitational acceleration Gv to obtain the acceleration G acting on the vehicle S.

The deviation due to the gravitational acceleration Gv can be explained as follows. In a state where the total sum of the forces applied to the vehicle S is 0 and the vehicle S is stopped, according to the formula (1), the acceleration $G_{sens}$ output from the main inertial measurement sensor 5 is equal to −1 times the gravitational acceleration Gv. This is because the main inertial measurement sensor 5 calculates the acceleration based on the inertial force and cannot distinguish the gravity acting on the weight from the inertial force. In other words, the main inertial measurement sensor 5 regards the vertically downward gravity acting on the weight as the inertial force caused by vertically upward acceleration of the housing (vehicle body) and accordingly outputs the acceleration. The correction taking into account the influence of the gravitational acceleration Gv is the correction taking into account the influence of the main inertial measurement sensor 5 calculating the acceleration based on the inertial force.

The acceleration $G_{sens}$ measured by the main inertial measurement sensor 5 includes influence of turning of the vehicle body. The main inertial measurement sensor 5 outputs the angular velocity ω with respect to the acceleration coordinate system similarly to the acceleration $G_{sens}$. The x component of the angular velocity ω corresponds to a roll rate, the y component of the angular velocity ω corresponds to a pitch rate, and the z component of the angular velocity ω corresponds to a yaw rate. The main inertial measurement sensor 5 outputs the acquired angular velocity ω and acceleration $G_{sens}$ to the control device 17.

The other of the inertial measurement sensors 5, 7 (hereinafter, an auxiliary inertial measurement sensor 7) is a so-called 3-axis inertial measurement sensor, and acquires an acceleration $G'_{sensx}$ in the x axis direction, an acceleration $G'_{sensy}$ in the y axis direction, and an angular velocity $ω'_z$ about the z axis in the fixed coordinate system based on the principle similar to that of the main inertial measurement sensor 5, and outputs them to the control device 17.

The auxiliary inertial measurement sensor 7 may be a sensor provided in a device not specifically designed for the purpose of estimation of the vehicle state, and may be a sensor provided in a side slip control system (also called a vehicle stability assist (VSA) system), for example.

The wheel speed sensor 9 acquires the wheel speed of at least one of the wheels of the vehicle S. The wheel speed sensor 9 may acquire the wheel speed of a driving wheel. The wheel speed sensor 9 outputs the acquired wheel speed to the control device 17.

The external environment recognition device is a device for acquiring information on the surroundings of the vehicle S and includes, for example, an in-vehicle camera, a radar, a lidar, and the like.

The steering and acceleration/deceleration device 13 performs steering and acceleration/deceleration of the vehicle S. The steering and acceleration/deceleration device 13 includes a steering device for steering the vehicle S, a driving device such as an internal combustion engine or a motor for providing a driving force to the vehicle S, and a brake device for decelerating the vehicle S.

The HMI 15 is a device for receiving input from an occupant and making a notification to the occupant. In the present embodiment, the HMI 15 is constituted of a touch panel. When the HMI 15 receives input from the occupant instructing start of autonomous traveling but the estimation accuracy of the vehicle state is low, the HMI 15 makes a notification that autonomous traveling cannot be performed.

The control device 17 is a so-called microcomputer provided with a processor, a RAM, etc. and is connected with the two inertial measurement sensors 5, 7, the wheel speed sensor 9, the external environment recognition device, the steering and acceleration/deceleration device 13, and the HMI 15.

The control device 17 includes a vehicle state estimator 31 (vehicle state estimation unit) that estimates the vehicle state, an abnormality determiner 33 (abnormality determination unit) that determines an abnormality of the main inertial measurement sensor 5, a state management unit 35 that manages the autonomous traveling level of the vehicle S based on the input to the HMI 15, an own vehicle position estimation unit 37 that estimates the own vehicle position, and a travel control unit 39 that controls steering and acceleration/decelerate of the vehicle S to make the vehicle S travel autonomously. The vehicle state estimated by the vehicle state estimator 31 includes the vehicle velocity, the time change rate of the vehicle velocity (hereinafter, motion acceleration), and the attitude angle.

When there is input from the HMI 15 instructing start of autonomous traveling, the abnormality determiner 33 determines presence or absence of an abnormality of the main inertial measurement sensor 5. When the abnormality determiner 33 determines that there is no abnormality in the main inertial measurement sensor 5, the state management unit 35 provides an instruction to the own vehicle position estimation unit 37 to make the own vehicle position estimation unit 37 estimate the own vehicle position based on the signal from the external environment recognition device and the vehicle state estimated by the vehicle state estimator 31 based on the measured value from the main inertial measurement sensor 5 (6-axis inertial measurement sensor). The travel control unit 39 controls the steering and acceleration/deceleration device 13 by using the own vehicle position estimated by the own vehicle position estimation unit 37 to make the vehicle S travel autonomously.

The vehicle control system 3 is further provided with a slip determination device 41 (determination unit) that determines whether the wheels are in a slip state (or a sliding state). The slip determination device 41 includes an anti-lock braking system (ABS) 43 and a traction control system (TCS) 45.

The anti-lock braking system 43 prevents stop of rotation of the wheels (or locking the wheels) due to sudden braking and thereby prevents the wheels from slipping. In the present embodiment, the anti-lock braking system 43 determines whether the wheels are locked and slipping based on the wheel speed and the vehicle velocity. When it is determined that the wheels are slipping, the anti-lock braking system 43 outputs a flag signal indicating the occurrence of slip of the wheels to the control device 17, loosens the braking force to recover the wheel speed, and then repeats holding and increasing of the brake pressure to decelerate the vehicle S.

The traction control system 45 prevents spinning of the wheels at the time of starting or sudden acceleration. In the present embodiment, the traction control system 45 determines whether the wheels are spinning and slipping by comparing the wheel speed with the vehicle velocity. When it is determined that the wheels are spinning and slipping, the traction control system 45 outputs a flag signal indicating that the wheels are slipping to the control device 17 and controls the rotation speed of the driving wheels.

In the following, the vehicle state estimator 31 will be described in detail. The vehicle state estimator 31 calculates an estimated value of the vehicle state including the vehicle velocity, the motion acceleration, and the attitude angle based on the signals from the main inertial measurement sensor 5, the wheel speed sensor 9, and the slip determination device 41, and updates the vehicle state with the calculated estimated value.

When the vehicle velocity is denoted by $u(=u_x i+u_y j+u_z k)$, the motion acceleration a is represented by the following formula (2).

$$a = \frac{du_x}{dt}i + \frac{du_y}{dt}j + \frac{du_z}{dt}k \quad (2)$$

The motion acceleration a is a time change of the vehicle velocity with respect to the acceleration coordinate system and is also referred to as a relative derivative of the vehicle velocity. On the other hand, the time change of the vehicle velocity with respect to the fixed coordinate system (du/dt) corresponds to the acceleration G in the fixed coordinate system and is also referred to as an absolute derivative of the vehicle velocity. The acceleration G and the motion acceleration a satisfy the following relationship.

$$G = \frac{du}{dt} = a + \omega \times u \quad (3)$$

The vehicle state estimator 31 outputs the attitude angle by use of Euler angles (or Tait-Bryan angles). Namely, when the roll angle is denoted by $\varphi$, the pitch angle is denoted by $\theta$, and the yaw angle is denoted by $\psi$, the attitude angle $\Omega$ is represented by the following formula (4).

$$\Omega = [\varphi \theta \psi]^T \quad (4)$$

In the following, description will be made in which an estimated value of the vehicle velocity will be referred to as an estimated vehicle velocity v, an estimated value of the motion acceleration will be referred to as an estimated motion acceleration $\alpha$, an estimated value of the attitude angle will be referred to as an estimated attitude angle $\Theta$, an estimated vehicle velocity before update will be referred to as a pre-update estimated vehicle velocity $v_0$, and an estimated attitude angle before update will be referred to as a pre-update estimated attitude angle $\Theta_0$.

The vehicle state estimator 31 (vehicle state estimation unit) includes, as functional units for estimating the vehicle state, an activation determination unit 51, a motion acceleration calculation unit 53, a motion acceleration correction/calculation unit 55, a motion acceleration integrator 57, an attitude angle change rate calculation unit 59 (also referred to as an angular velocity coordinate conversion unit), a gravity term estimation unit 61, an angle decomposition unit 63, an attitude angle change rate correction/calculation unit 65, and an attitude angle change rate integrator 67. These functional units are configured by executing a vehicle state estimation program by a processor.

The activation determination unit 51 sets an observer gain related to the velocity estimation (hereinafter, an acceleration gain K) and an observer gain related to the attitude estimation (hereinafter, an attitude angle gain $K_{ANG}$) based on the flag signal calculated by the anti-lock braking system 43 and the flag signal from the traction control system 45. The activation determination unit 51 outputs the acceleration gain K and the attitude angle gain $K_{ANG}$ to the motion acceleration correction/calculation unit 55.

Note that when either one of the flag signal from the anti-lock braking system 43 which indicates activation of the anti-lock braking system 43 and the flag signal from the traction control system 45 which indicates activation of the traction control system 45 is input, the activation determination unit 51 determines that the wheels are slipping, and sets each of the acceleration gain K and the attitude angle gain $K_{ANG}$ to be smaller compared to the other cases.

The motion acceleration calculation unit 53 is configured to receive the angular velocity ω and the acceleration $G_{sens}$ acquired by the main inertial measurement sensor 5, the pre-update estimated vehicle velocity $v_0$, and the pre-update estimated attitude angle $\Theta_0 (=[\varphi_0, \theta_0, \psi_0]^T$. The motion acceleration calculation unit 53 calculates the gravitational acceleration Gv ($\theta_0$, $\varphi_0$) in the acceleration coordinate system according to the formula (5).

$$G_v(\theta_0, \phi_0) = \begin{bmatrix} g\sin(\theta_0) \\ -g\cos(\theta_0)\sin(\phi_0) \\ -g\cos(\theta_0)\cos(\phi_0) \end{bmatrix} \quad (5)$$

Note that, in the formula (5), g represents the magnitude of the gravitational acceleration (approximately 9.8 m/s²).

Thereafter, the motion acceleration calculation unit 53 calculates a transient motion acceleration $\alpha_w$ by inputting the gravitational acceleration Gv ($\theta_0$, $\varphi_0$) calculated in accordance with the formula (5), the pre-update estimated vehicle velocity $v_0$, the angular velocity ω and the acceleration $G_{sens}$ acquired by the inertial measurement sensor into the following formula (6). Thereafter, the motion acceleration calculation unit 53 outputs the pre-update estimated vehicle velocity $v_0$ and the transient motion acceleration $\alpha_w$ to the motion acceleration correction/calculation unit 55.

$$\alpha_w = G_v(\theta_0\phi_0) + G_{sens} - \omega \times v_0 \quad (6)$$

As can be understood from the formula (1) and the formula (3), the formula (6) is derived from the formula (1) and the formula (3).

Also, the motion acceleration calculation unit 53 calculates a transport acceleration $\alpha_c$ (also called a centripetal acceleration) based on the below formula (7) by use of the angular velocity ω acquired by the main inertial measurement sensor 5 and the pre-update estimated vehicle velocity $v_0$, and outputs the transport acceleration $\alpha_c$ to the gravity term estimation unit 61.

The motion acceleration correction/calculation unit 55 is configured to receive the wheel speed from the wheel speed sensor 9, the pre-update estimated vehicle velocity $v_0$ and the motion acceleration $\alpha_w$ from the motion acceleration calculation unit 53, and the acceleration gain K from the activation determination unit 51.

The motion acceleration correction/calculation unit 55 acquires a steady-state vehicle velocity $v_{meas}$, which is an estimated value of the vehicle velocity, based on the wheel speed input from the wheel speed sensor 9. The steady-state vehicle velocity $v_{meas}$ substantially matches the vehicle velocity under circumstances where the wheels are not slipping. However, under circumstances where the wheels are slipping, the steady-state vehicle velocity $v_{meas}$ does not match the vehicle velocity.

Further, the motion acceleration correction/calculation unit 55 calculates and updates the estimated motion acceleration α by inputting the motion acceleration $\alpha_w$, the pre-update estimated vehicle velocity $v_0$, the steady-state vehicle velocity $v_{meas}$, and the acceleration gain K into the formula (8) below.

$$\alpha = \alpha_w - K(v_0 - v_{mes}) \quad (8)$$

The right side of the formula (8) corresponds to a correction of the transient motion acceleration $\alpha_w$ using a feedback term ($-K(v_0-v_{meas})$). As will be understood by referring to the formula (2), the formula (8) is a differential equation with respect to velocity, and the formula (8) corresponds to a so-called observer equation with respect to velocity (hereinafter, the formula (8) will be referred to as a velocity observer equation). In other words, the motion acceleration correction/calculation unit 55 calculates the estimated motion acceleration α by using the velocity observer equation (the formula (8)), which is a differential equation with respect to velocity and in which the transient motion acceleration $\alpha_w$ is corrected using the feedback term.

The motion acceleration correction/calculation unit 55 outputs the calculated estimated motion acceleration α to the gravity term estimation unit 61 and the own vehicle position estimation unit 37.

The motion acceleration integrator 57 is configured to receive the estimated motion acceleration α from the motion acceleration correction/calculation unit 55. The motion acceleration integrator 57 performs time integration of the estimated motion acceleration α and updates the estimated vehicle velocity v with the value obtained by the time integration ($\int \alpha dt$).

Note that when performing time integration of the estimated motion acceleration α, the motion acceleration integrator 57 may ignore the time change of the unit vectors i, j, k, and individually integrate the x component, the y component, and the z component of the estimated motion acceleration α to acquire the estimated vehicle velocity v. Specifically, the motion acceleration integrator 57 may perform the calculation by using a so-called Euler method by using the pre-update estimated vehicle velocity $v_0$ (assumed that the x, y, z components thereof at the time of calculation are $v_{0x}$, $v_{0y}$, $v_{0z}$, respectively) and the estimated motion acceleration α (assumed that the x, y, z components thereof at the time of calculation are $\alpha_x$, $\alpha_y$, $\alpha_z$, respectively), for example. More specifically, the motion acceleration integrator 57 may calculate $(v_{0x}+\alpha_x\Delta t)i+(v_{0y}+\alpha_y\Delta t)j+(v_{0z}+\alpha_z\Delta t)k$ (note that i, j, k are unit vectors in the x, y, z directions, respectively, at the time of calculation of the estimated vehicle velocity, and Δt is a control interval of the estimation calculation and more specifically is an elapsed time from the calculation of the pre-update estimated vehicle velocity $v_0$) and output the calculated value as the estimated vehicle velocity v.

The motion acceleration integrator 57 outputs the updated estimated vehicle velocity v to the motion acceleration calculation unit 53 and the travel control unit 39.

The attitude angle change rate calculation unit 59 is configured to receive the angular velocity $\omega$ acquired by the main inertial measurement sensor 5 and the pre-update estimated value of the attitude angle (the pre-update estimated attitude angle $\Theta_0$). The attitude angle change rate calculation unit 59 inputs the angular velocity $\omega$ and the pre-update estimated attitude angle $\Theta_0$ into the following formula (9) to calculate an attitude angle change rate $\Delta\Theta_T$ ($\theta_0$, $\varphi_0$, $\omega$) which is a time change rate of the attitude angle, and outputs it to the attitude angle change rate correction/calculation unit 65.

$$\Delta\Theta_T(\theta_0, \phi_0, \omega) = \frac{1}{\cos(\theta_0)}\begin{bmatrix} \cos(\theta_0) & \sin(\phi_0)\sin(\theta_0) & \cos(\phi_0)\sin(\theta) \\ 0 & \cos(\phi_0)\cos(\theta_0) & -\sin(\phi)\cos(\theta) \\ 0 & \sin(\phi_0) & \cos(\phi) \end{bmatrix}\omega \quad (9)$$

The formula (9) indicates that the attitude angle change rate $\Delta\Theta_T$ ($\theta_0$, $\varphi_0$, $\omega$) corresponds to the attitude angle change rate predicted by performing coordinate conversion of the angular velocity $\omega$.

The gravity term estimation unit 61 is configured to receive the acceleration $G_{sens}$ acquired by the inertial measurement sensor, the estimated motion acceleration $\alpha$ updated by the motion acceleration correction/calculation unit 55, and the transport acceleration $\alpha_c$ from the motion acceleration calculation unit 53. The gravity term estimation unit 61 inputs the acceleration $G_{sens}$, the post-update estimated motion acceleration $\alpha$, and the transport acceleration $\alpha_c$ into the below formula (10) to calculate a gravity term $G_{std}$, and outputs it to the angle decomposition unit 63.

$$G_{std} = \alpha + \alpha_c - G_{sens}(=-(G_{sens} - \alpha - \alpha_c)) \quad (10)$$

The formula (10) indicates that the gravity term $G_{std}$ corresponds to a value obtained by subtracting the estimated motion acceleration $\alpha_0$ and the transport acceleration $\alpha_c$ ($=\omega \times v_0$) from the acceleration $G_{sens}$ acquired by the inertial measurement sensor and inverting the result of the subtraction by taking into account that the gravitational acceleration is calculated from the inertial force.

The gravity term $G_{std}$ is input to the angle decomposition unit 63 from the gravity term estimation unit 61. The angle decomposition unit 63 acquires the components $g_{estX}$, $g_{estY}$, and $g_{estZ}$ of the gravity term $G_{std}$ based on the following formula (11).

$$G_{std} = \begin{bmatrix} g_{estX} \\ g_{estY} \\ g_{estZ} \end{bmatrix} \quad (11)$$

Then, the angle decomposition unit 63 acquires a steady-state attitude angle $\Theta_{grav}$ by inputting the gravity term $G_{std}$ into the below formula (12) and outputs the steady-state attitude angle $\Theta_{grav}$ to the attitude angle change rate correction/calculation unit 65 (here, g is approximately 9.8 m/s$^2$).

$$\begin{cases} \theta_{std} = \arcsin\left(\frac{g_{estX}}{g}\right) \\ \phi_{std} = \arcsin\left(-\frac{g_{estY}}{g\cos(\theta_{std})}\right) \\ \Theta_{grav}(\omega, v_0, v_{mes}, \alpha_0, G_{sens}) = \begin{bmatrix} \phi_{std} \\ \theta_{std} \\ 0 \end{bmatrix} \end{cases} \quad (12)$$

Note that in the formula (12), the yaw angle $\psi$ is not calculated from the gravity term $G_{std}$, and only the roll angle $\varphi$ and the pitch angle $\theta$ are calculated. As can be understood by referring to the formula (5), the formulas (11) and (12) indicate that the steady-state attitude angle $\Theta_{grav}$ is an attitude angle estimated by using that the direction of the estimated gravitational acceleration (namely, the gravity term $G_{std}$) is vertically downward.

The attitude angle change rate correction/calculation unit 65 is configured to receive the steady-state attitude angle $\Theta_{grav}$ from the angle decomposition unit 63 and the attitude angle gain $K_{ANG}$ regarding the attitude estimation from the activation determination unit 51. By using the below formula (13) based on the steady-state attitude angle $\Theta_{grav}$ input from the angle decomposition unit 63, the attitude angle gain $K_{ANG}$ regarding the attitude estimation, and the pre-update estimated attitude angle $\Theta_0$, the attitude angle change rate correction/calculation unit 65 acquires a time change rate $\Delta\Theta$ of the estimated attitude angle (namely, a time derivative of the estimated attitude angle) and outputs it to the attitude angle change rate integrator 67.

$$\Delta\Theta = \Delta\Theta_T(\theta_0,\phi_0,\omega) - K_{ANG}(\Theta_0 - \Theta_{grav}) \quad (13)$$

The right side of the formula (13) corresponds to a correction of the attitude angle change rate $\Delta\Theta_T$ ($\theta_0$, $\varphi_0$, $\omega$) using a feedback term ($-K_{ANG}$ ($\Theta_0 - \Theta_{grav}$)). The formula (13) is a differential equation with respect to the attitude angle, and corresponds to a so-called observer equation with respect to the attitude angle (hereinafter, the formula (13) will be referred to as an attitude angle observer equation). In other words, the attitude angle change rate correction/calculation unit 65 calculates the estimated attitude angle time change rate by using the attitude angle observer equation (the formula (13)) in which the attitude angle change rate $\Delta\Theta_T$ ($\theta_0$, $\varphi_0$, $\omega$) is corrected using the feedback term.

Further, the attitude angle change rate correction/calculation unit 65 outputs the pre-update estimated attitude angle $\Theta_0$ and the steady-state attitude angle $\Theta_{grav}$ estimated based on the gravity term $G_{std}$ to the abnormality determiner 33.

The attitude angle change rate integrator 67 is configured to receive the time change rate $\Delta\Theta$ of the estimated attitude angle. The attitude angle change rate integrator 67 performs time integration of the time change rate $\Delta\Theta$ of the estimated attitude angle and updates the estimated attitude angle $\Theta$ with the value obtained by the time integration (namely, $\int\Delta\Theta dt$).

More specifically, the attitude angle change rate integrator 67 may calculate the value of the time integration by adding the product of the time $\Delta t$ required till the update and the time change rate $\Delta\Theta$ of the estimated attitude angle to the pre-update estimated attitude angle $\Theta_0$, and update the estimated attitude angle $\Theta$ with the value of the time integration ($\Theta_0 + \Delta\Theta\Delta t$).

The attitude angle change rate integrator 67 outputs the updated estimated attitude angle $\Theta$ to the motion acceleration calculation unit 53 and the travel control unit 39.

The control device 17 (more specifically, the vehicle state estimator 31 and the abnormality determiner 33), the auxiliary inertial measurement sensor 7 (3-axis inertial measurement sensor), the wheel speed sensor 9, and the slip determination device 41 constitute a vehicle state estimation device 46 that estimates the vehicle state including the vehicle velocity and the attitude angle based on the measured values obtained by the main inertial measurement sensor 5 (6-axis inertial measurement sensor).

The control device (more specifically, the abnormality determiner 33) and the auxiliary inertial measurement sensor 7 (3-axis inertial measurement sensor) constitute an abnormality determination device 68 that determines an abnormality of the main inertial measurement sensor 5 (6-axis inertial measurement sensor).

Next, description will be made of the abnormality determiner 33. The abnormality determiner 33 executes an abnormality determination program thereby to perform an abnormality determination process shown in FIG. 3 at all times while the vehicle S is traveling autonomously, so that an abnormality determination method for determining presence or absence of an abnormality of the main inertial measurement sensor 5 is executed. In the following, the abnormality determination process performed by the abnormality determiner 33 will be described along the flowchart of FIG. 3.

Figure 3:
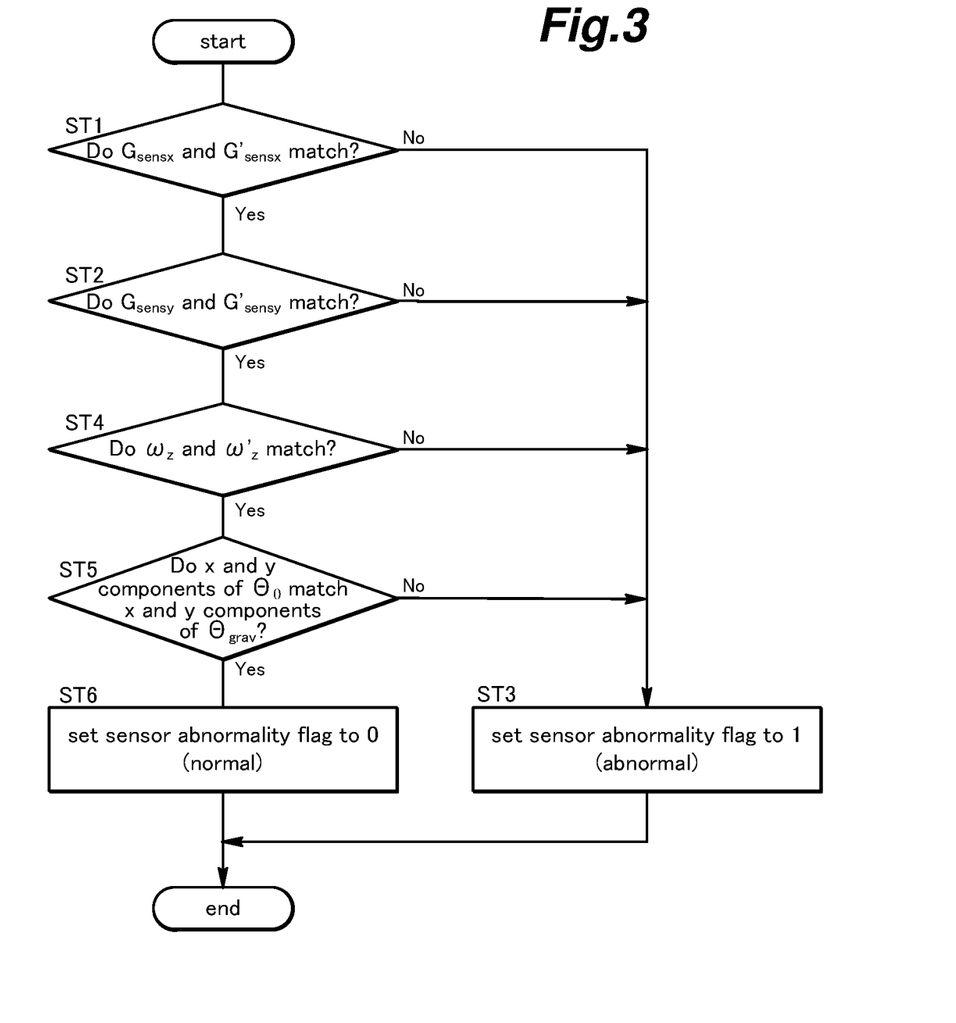
FIG. 3 is a flowchart of an abnormality determination process.

In the first step ST1 of the abnormality determination process, the abnormality determiner 33 determines whether the x component $G_{sensx}$ of the acceleration $G_{sens}$ acquired by the main inertial measurement sensor 5 matches the acceleration $G'_{sensx}$ in the x direction acquired by the auxiliary inertial measurement sensor 7. The abnormality determiner 33 may determine whether the x component $G_{sensx}$ of the acceleration $G_{sens}$ acquired by the main inertial measurement sensor 5 matches the acceleration $G'_{sensx}$ in the x direction acquired by the auxiliary inertial measurement sensor 7 by performing correlation comparison therebetween. Also, the abnormality determiner 33 may determine that the x component $G_{sensx}$ of the acceleration $G_{sens}$ acquired by the main inertial measurement sensor 5 matches the acceleration $G'_{sensx}$ in the x direction acquired by the auxiliary inertial measurement sensor 7 when the difference therebetween is less than or equal to a prescribed threshold value. The abnormality determiner 33 executes step ST2 when it is determined that the two values match each other, and executes step ST3 when it is not.

In step ST2, the abnormality determiner 33 determines whether the y component $G_{sensy}$ of the acceleration $G_{sens}$ acquired by the main inertial measurement sensor 5 matches the acceleration $G'_{sensy}$ in the y direction acquired by the auxiliary inertial measurement sensor 7. The abnormality determiner 33 may determine whether the y component $G_{sensy}$ of the acceleration $G_{sens}$ acquired by the main inertial measurement sensor 5 matches the acceleration $G'_{sensy}$ in the y direction acquired by the auxiliary inertial measurement sensor 7 by performing correlation comparison therebetween. The abnormality determiner 33 may determine that the y component $G_{sensy}$ of the acceleration $G_{sens}$ acquired by the main inertial measurement sensor 5 matches the acceleration $G'_{sensy}$ in the y direction acquired by the auxiliary inertial measurement sensor 7 when the difference therebetween is less than or equal to a prescribed threshold value. The abnormality determiner 33 executes step ST4 when it is determined that the two values match each other and executes step ST3 when it is not.

In step ST3, the abnormality determiner 33 sets a flag indicating presence or absence of an abnormality of the main inertial measurement sensor 5 (sensor abnormality flag) to a value (for example, 1) indicating presence of an abnormality. When the setting is completed, the abnormality determiner 33 ends the abnormality determination process.

In step ST4, the abnormality determiner 33 determines whether the z component $\omega_z$ of the angular velocity $\omega$ acquired by the main inertial measurement sensor 5 matches the angular velocity $\omega'_z$ about the z direction acquired by the auxiliary inertial measurement sensor 7. The abnormality determiner 33 may determine whether $\omega_z$ matches $\omega'_z$ by performing correlation comparison therebetween. Also, the abnormality determiner 33 may determine that $\omega_z$ matches $\omega'_z$ when the difference therebetween is less than or equal to a prescribed threshold value. The abnormality determiner 33 executes step ST5 when it is determined that the two values match each other and executes step ST3 when it is not.

In step ST5, the abnormality determiner 33 determines whether the x and y components of the pre-update estimated attitude angle $\Theta_0$ output from the vehicle state estimator 31 (more specifically, from the attitude angle change rate integrator 67) match the x and y components of the steady-state attitude angle $\Theta_{grav}$, respectively. Preferably, the abnormality determiner 33 calculates a difference between each of the two pairs of corresponding components as an estimation error and determines that the corresponding components of each pair match each other when the estimation error for the pair is less than or equal to a corresponding prescribed threshold value. The abnormality determiner 33 executes step ST6 when it is determined that the corresponding components of both pairs match each other and executes step ST3 when at least one of the estimation error between the x components and the estimation error between the y components is greater than the corresponding threshold value.

In step ST6, the abnormality determiner 33 sets the sensor abnormality flag to a value (for example, 0) indicating that the sensors are normal (no abnormality), and outputs the sensor abnormality flag to the state management unit 35. When the output is completed, the abnormality determiner 33 ends the abnormality determination process.

The state management unit 35 allows the vehicle S to travel autonomously when the sensor abnormality flag input from the abnormality determiner 33 has a value indicating that the sensors are normal. On the other hand, when the sensor abnormality flag has a value indicating that the sensors have abnormality, the state management unit 35 prevents autonomous traveling of the vehicle S. More specifically, when the sensor abnormality flag has a value indicating that the sensors have abnormality, the state management unit 35 does not accept input to the HMI 15 for selecting autonomous traveling of the vehicle S. Also, in a case where the sensor abnormality flag having a value indicating that the sensors have abnormality is input during autonomous traveling of the vehicle S, the state management unit 35 causes the HMI 15 to make a display indicating that there is abnormality in the sensors. Further, preferably the state management unit 35 promptly stops the autonomous traveling of the vehicle S and makes the vehicle S transition to a manual driving state in which the vehicle S travels according to the occupant's driving operation.

Next, the operation of the vehicle state estimation device 46 configured as above will be described.

When the flag signal indicating the activation of the anti-lock braking system 43 is not output from the anti-lock braking system 43 and the flag signal indicating the activation of the traction control system 45 is not output from the traction control system 45 (namely, when the wheels are not slipping), the activation determination unit 51 sets the acceleration gain K and the attitude angle gain $K_{ANG}$ to sufficiently large values compared to when either of the flag signals is output.

The vehicle state estimator 31 calculates the estimated vehicle velocity according to the formula (8). Since the left side of the formula (8) corresponds to the motion acceleration, namely, a derivative of the vehicle velocity, the formula (8) corresponds to an observer equation in which the feedback term $(-K (v_0-v_{meas}))$ is added to the differential equation with respect to the vehicle velocity (formula (6), hereinafter referred to as an acceleration equation). When the activation determination unit 51 sets the acceleration gain K to a sufficiently large value, the vehicle state estimator 31 decides the estimated vehicle velocity such that the feedback term $(-K (v_0-v_{meas}))$ comes close to zero. Namely, the vehicle state estimator 31 decides the estimated vehicle velocity as a value close to the steady-state vehicle velocity (the contribution of the steady-state vehicle velocity is higher than that of the transient vehicle velocity obtained by numerical integration of the right side of the acceleration equation).

The vehicle state estimator 31 calculates the estimated attitude angle according to the formula (13). Since the left side of the formula (13) corresponds to a derivative of the attitude angle, the formula (13) corresponds to an observer equation in which the feedback term $(-K_{ANG} (\Theta_0-\Theta_{grav}))$ is added to the differential equation with respect to the attitude angle $(\Delta\Theta=\Delta\Theta_T,$ hereinafter referred to as an attitude angle equation). When the activation determination unit 51 sets the attitude angle gain $K_{ANG}$ to a sufficiently large value, the vehicle state estimator 31 decides the estimated attitude angle such that the feedback term $(-K_{ANG} (\Theta_0-\Theta_{grav}))$ comes close to zero. Namely, the vehicle state estimator 31 decides the estimated attitude angle as a value close to the steady-state attitude angle $\Theta_{grav}$ (the contribution of the steady-state attitude angle $\Theta_{grav}$ is higher than that of the transient attitude angle obtained by numerical integration of the right side of the attitude angle equation).

When the flag signal indicating activation of the anti-lock braking system 43 is output from the anti-lock braking system 43 and/or when the flag signal indicating activation of the traction control system 45 is output from the traction control system 45 (namely, when the wheels are slipping), the activation determination unit 51 sets the acceleration gain K and the attitude angle gain $K_{ANG}$ to sufficiently small values.

When the activation determination unit 51 sets the acceleration gain K to a sufficiently small value, the vehicle state estimator 31 decides the estimated vehicle velocity as a value close to the transient vehicle velocity obtained by numerical integration of the right side of the acceleration equation (the contribution of the transient vehicle velocity is higher than that of the steady-state vehicle velocity). Also, when the activation determination unit 51 sets the attitude angle gain $K_{ANG}$ to a sufficiently small value, the vehicle state estimator 31 decides the estimated attitude angle as a value close to the transient attitude angle obtained by numerical integration of the right side of the attitude angle equation (the contribution of the transient attitude angle is higher than that of the steady-state attitude angle).

Next, the effect of the vehicle state estimator 31 configured as above will be described.

When the wheels are not slipping (namely, not in the sliding state), the vehicle velocity obtained from the wheel speed is close to the true value. On the other hand, when the wheels are in the sliding state, the vehicle velocity obtained from the wheel speed is far from the true value and the error becomes large.

Figure 4A:
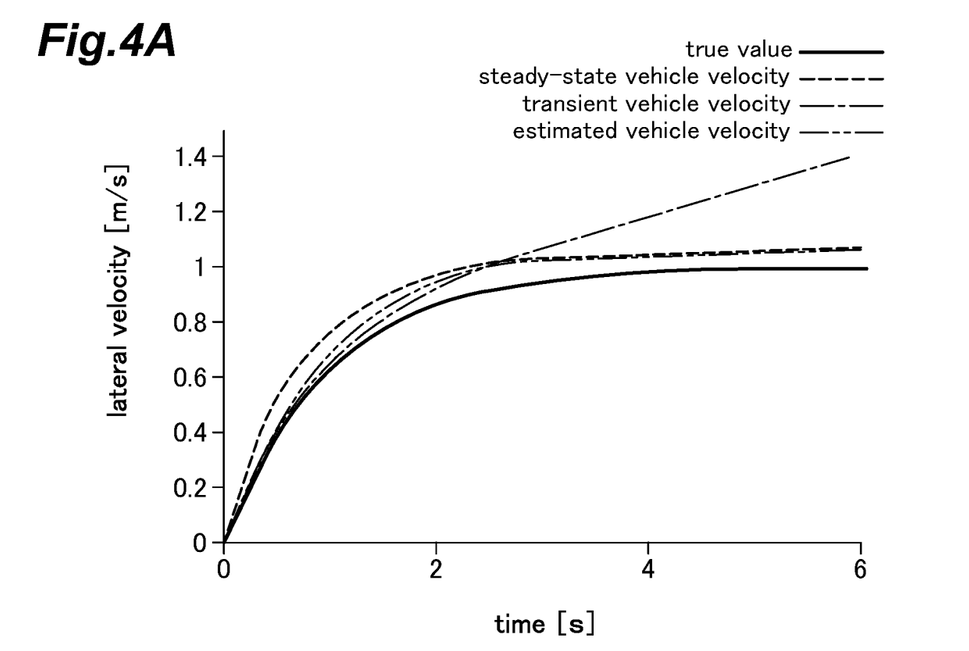
FIG. 4A is a graph showing a true value of a lateral velocity, a steady-state vehicle velocity, a transient vehicle velocity, and an estimated value of a vehicle velocity (estimated vehicle velocity) when the vehicle is traveling without slipping (gripping travel)

When the wheels are not slipping, as shown in FIG. 4A, the estimated vehicle velocity (the estimated value of the vehicle velocity) (two-dot chain line) is decided as a value close to the steady-state vehicle velocity acquired by the wheel speed sensor 9 (broken line). On the other hand, the transient vehicle velocity (the one-dot chain line) obtained by numerical integration of the right side of the acceleration equation includes an error due to the numerical integration. Therefore, by deciding the estimated vehicle velocity as a value close to the steady-state vehicle velocity (namely, a value closer to the steady-state vehicle velocity than to the transient vehicle velocity), it is possible to make the estimated vehicle velocity come closer to the true value (solid line) compared to the case where the estimated vehicle velocity is decided as a value close to the transient vehicle velocity, whereby the estimation accuracy of the vehicle velocity can be enhanced.

Also, when the wheels are not slipping, since the vehicle velocity obtained based on the wheel speed is close to the true value and the transient attitude angle obtained by numerical integration of the right side of the attitude angle equation includes an error due to the numerical integration, the steady-state attitude angle calculated from the wheel speed, the acceleration acquired by the inertial measurement sensor, and the like is closer to the true value of the attitude angle than the transient attitude angle is.

Thus, when the wheels are not slipping, the estimated attitude angle (the estimated value of the attitude angle) is decided to be close to the steady-state attitude angle (namely, a value closer to the steady-state attitude angle than to the transient attitude angle). Thereby, compared to the case where the estimated attitude angle is decided to be close to the transient attitude angle, the estimation accuracy can be enhanced.

Figure 4B:
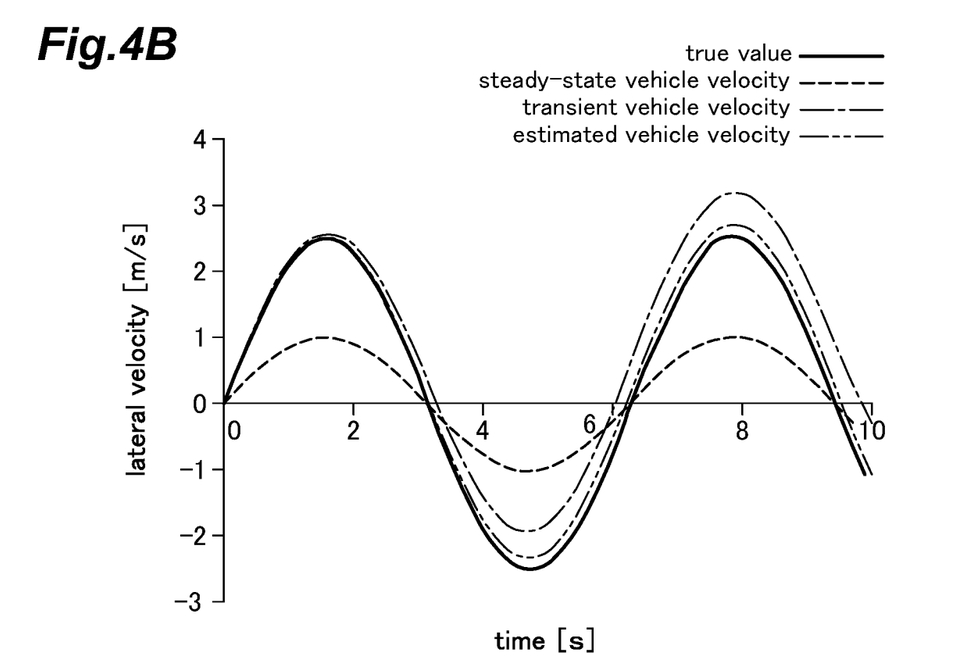
FIG. 4B is a graph showing a true value of a lateral velocity, a steady-state vehicle velocity, a transient vehicle velocity, and an estimated value of a vehicle velocity (estimated vehicle velocity) when the vehicle is slipping while traveling (slipping travel).

On the other hand, when the wheels are slipping (namely, in the sliding state), as shown in FIG. 4B, the estimated vehicle velocity (the estimated value of the vehicle velocity) (two-dot chain line) is decided to be a value close to the transient vehicle velocity (one-dot chain line) obtained by numerical integration of the right side of the acceleration equation (namely, a value closer to the transient vehicle velocity than to the steady-state vehicle velocity). Thereby, it is possible to make the estimated vehicle velocity come closer to the true value (solid line) compared to the case where the estimated value of the vehicle velocity is decided to be a value close to the steady-state vehicle velocity (broken line), whereby the measurement accuracy of the vehicle velocity can be enhanced.

When the wheels are slipping, the transient attitude angle is closer to the true value than the steady-state attitude angle calculated based on the wheel speed is. When the wheels are slipping, the estimated attitude angle is decide to be a value close to the transient attitude angle (namely, a value closer to the transient attitude angle than to the steady-state attitude angle), and therefore, compared to the case where the estimated attitude angle is decided to be a value close to the steady-state attitude angle, the measurement accuracy of the attitude angle can be enhanced.

As shown in FIG. 4A, the transient vehicle velocity changes to deviate from the true value of the vehicle velocity with lapse of time. In the present embodiment, the acceleration gain K is sufficiently large, and when the wheels are not slipping, the estimated vehicle velocity is calculated to be substantially equal to the steady-state vehicle velocity acquired by the wheel speed sensor 9. When the wheels start slipping, the acceleration gain K is changed, and the estimated vehicle velocity is calculated to be a value close to the transient vehicle velocity obtained by numerical integration with the estimated vehicle velocity when the wheels started slipping being the initial value. Thereby, the lower limit (also called the lower end) of the interval of integration for the numerical integration used in calculation of the transient vehicle velocity can be set to the time when the slipping starts. Thereby, compared to the case where the lower limit of the interval of integration is set to the time when the vehicle starts traveling, the interval of integration used in calculation of the transient vehicle velocity can be shortened, and therefore, an error of the estimated vehicle velocity (namely, the transient vehicle velocity) during slipping can be reduced.

The mass of the vehicle S varies depending on the use state of the vehicle S such as a load volume, and the friction coefficient between the road surface and the wheels (tires) also varies significantly depending on the road surface condition. Therefore, if the equation of motion of the vehicle S is established by using the parameters having uncertainty to represent a cornering power coefficient or the like that varies depending on the parameters of the tires, it is necessary to change the parameters by taking into account the use state and the road surface condition, which make it difficult to estimate the vehicle state.

In the present embodiment, as shown in the formula (8) and the formula (13), neither of the velocity observer equation and the attitude angle observer equation includes the mass and the friction coefficient. Therefore, it is possible to calculate the vehicle velocity and the attitude angle without depending on the parameters having uncertainty, such as the mass of the vehicle S and the friction coefficient. This enables estimation of the vehicle state that does not depend on the use state of the vehicle S or the road surface condition.

By changing the acceleration gain K and the attitude angle gain $K_{ANG}$, it is possible to decide the estimated vehicle velocity (the estimated attitude angle) as a value close to the steady-state vehicle velocity (the steady-state attitude angle) when the wheels are not slipping and as a value close to the transient vehicle velocity (the transient attitude angle) when the wheels are slipping. Also, since the estimated vehicle velocity (the estimated attitude angle) is acquired by integration and update of the observer equation, both transient and steady-state properties can be fused, whereby the estimated vehicle velocity (the estimated attitude angle) can be decided as a most likely value over the entire range of the steady/unsteady motion.

In the above embodiment, based on the activation of the anti-lock braking system 43 or the traction control system 45, it is determined whether the wheels are slipping and the acceleration gain K and the attitude angle gain $K_{ANG}$ are set accordingly. In this way, the activation of the anti-lock braking system 43 or the traction control system 45 is used in the determination of whether the wheels are in the sliding state, whereby the determination can be made easily.

Next, the operation and effect of the abnormality determination device 68 will be described.

When the wheels are slipping, the vehicle velocity obtained based on the wheel speed differs from the true value, and consequently, the acceleration in the fore and aft direction of the vehicle acquired by the main inertial measurement sensor 5 (6-axis inertial measurement sensor) and the acceleration in the fore and aft direction of the vehicle acquired based on the wheel speed may deviate from each other. Therefore, it is difficult to determine an abnormality of the main inertial measurement sensor 5 by comparing the acceleration in the fore and aft direction acquired by the main inertial measurement sensor 5 with the acceleration in the fore and aft direction acquired by the wheel speed sensor 9.

In step ST1, the abnormality determiner 33 compares the acceleration in the fore and aft direction of the vehicle acquired by the main inertial measurement sensor 5 (6-axis inertial measurement sensor) with the acceleration in the fore and aft direction of the vehicle acquired by the auxiliary inertial measurement sensor 7 (3-axis inertial measurement sensor) and, when they do not match each other, determines that there is an abnormality in the main inertial measurement sensor 5 (6-axis inertial measurement sensor). Therefore, compared to the case where the acceleration in the fore and aft direction acquired based on the wheel speed sensor 9 is used, it is possible to properly determine an abnormality of the main inertial measurement sensor 5 in the detection of the acceleration in the fore and aft direction even when the wheels are slipping. Thereby, it is possible to properly determine whether the movement amount of the vehicle S in the forward direction can be accurately acquired, namely, whether the own position can be properly evaluated.

In step ST2, the abnormality determiner 33 compares the acceleration in the lateral direction acquired by the main inertial measurement sensor 5 with the acceleration in the lateral direction of the vehicle acquired by the auxiliary inertial measurement sensor 7, and when they do not match, determines that there is an abnormality in the main inertial measurement sensor 5. Also, in step ST3, the abnormality determiner 33 determines whether the z component $\omega_z$ of the angular velocity ω (namely, yaw rate) acquired by the main inertial measurement sensor 5 matches the angular velocity $\omega'_z$ about the z axis (namely, yaw rate) acquired by the auxiliary inertial measurement sensor 7.

In this way, the abnormality determiner 33 compares the acceleration in the fore and aft direction, the acceleration in the lateral direction, and the yaw rate acquired by the main inertial measurement sensor 5 with the corresponding values acquired by the auxiliary inertial measurement sensor 7, thereby to determine presence or absence of an abnormality. Thereby, a mutual monitoring mechanism of the two sensors can be configured, and the use of the 3-axis inertial measurement sensor, which is lower in cost than the 6-axis inertial measurement sensor, can reduce the overall cost compared to when two 6-axis inertial measurement sensors are used.

Also, since the abnormality determiner 33 compares the acceleration in the fore and aft direction, the acceleration in the lateral direction, and the yaw rate acquired by the main inertial measurement sensor 5 with the corresponding values acquired by the auxiliary inertial measurement sensor 7, it is possible to more reliably detect an abnormality in the acceleration in the fore and aft direction, the acceleration in the lateral direction, and the yaw rate, which abnormality would be likely to cause a large error in the estimated value of the own position when the abnormality occurs.

In step ST5, the abnormality determiner 33 calculates a difference between the estimated value of the attitude angle (namely, the estimated attitude angle $\Theta_0$), which is obtained by numerical integration of the attitude angle equation (formula (13)), and the steady-state attitude angle $\Theta_{grav}$, and regards the x component and the y component of the difference as an estimation error. Because the estimation error becomes excessive at such times as when an abnormality occurs in the 6-axis inertial measurement sensor, the abnormality determiner 33 can determine presence or absence of an abnormality in the 6-axis inertial measurement sensor by using the estimation error.

More specifically, in step ST5, the abnormality determiner 33 calculates a difference between the x component of the estimated attitude angle $\Theta_0$ and the x component of the steady-state attitude angle $\Theta_{grav}$ and a difference between the y component of the estimated attitude angle $\Theta_0$ and they component of the steady-state attitude angle $\Theta_{grav}$, and determines whether each of the calculated differences is less than or equal to the corresponding threshold value. Thereby, the abnormality determiner 33 can detect abnormalities in the main inertial measurement sensor 5 (6-axis inertial measurement sensor) in the roll direction and the pitch direction, which are not evaluated in step ST2 and step ST4.

A concrete embodiment of the present invention has been described in the foregoing, but the present invention is not limited to the above embodiment and may be modified or altered in various ways.

In the above embodiment, the slip determination device 41 was provided with the anti-lock braking system 43 and the traction control system 45, but the present invention is not limited to this embodiment. For example, the slip determination device 41 may be provided with a vehicle stability assist (VSA) system (also called a side slip control system) and determine that the wheels are in the sliding state when control for suppressing the side slip of the wheels is performed when making a turning, for example. Also, the slip determination device 41 may be provided with a steering angle sensor and determine that the wheels are in the sliding state when the time change rate of the steering angle detected by the steering angle sensor is greater than or equal to a prescribed threshold value. Also, the sliding state may include a state in which the wheels are likely to be in the sliding state, a state in which the wheels may be in the sliding state depending on the road surface condition, and/or a state immediately before entering the sliding state.

In the above embodiment, the velocity at the position of the main inertial measurement sensor 5 (6-axis inertial measurement sensor) was calculated, but the present invention is not limited to this embodiment. For example, configuration may be made such that the velocity of a prescribed position of the vehicle S is estimated by converting the estimated velocity acquired by the main inertial measurement sensor 5 by using the below formula (14).

$$v = v_0 + \omega \times L \tag{14}$$

Note that, in the formula (14), v represents a post-conversion velocity, $v_0$ represents a pre-conversion velocity, $\omega$ represents an angular velocity detected by the main inertial measurement sensor 5, L represent a vector having an origin point at the position where the main inertial measurement sensor 5 is provided and a terminal point at the position of the vehicle at which the velocity is to be estimated.

In the above embodiment, the abnormality determiner 33 calculated the estimation error in ST5 based on the difference between the estimated value of the attitude angle obtained based on the attitude angle equation (namely, the estimated attitude angle $\Theta_0$) and the steady-state attitude angle $\Theta_{grav}$, but the present invention is not limited to this embodiment. For example, in ST5, the abnormality determiner 33 may determine an abnormality of the main inertial measurement sensor 5 by calculating an estimated value of the angular velocity in the pitch direction (roll direction) by correcting the acceleration in the z axis direction (or the x axis direction) measured by the main inertial measurement sensor 5 or the acceleration in the x axis direction measured by the auxiliary inertial measurement sensor 7 by using a predefined correction formula, and performing correlation comparison between the estimated value and the angular velocity in the pitch direction (roll direction) measured by the main inertial measurement sensor 5 (or determining whether the difference between the estimated value and the measured value is less than or equal to a threshold value).

The invention claimed is:

1. A vehicle control system for controlling a behavior of a vehicle to make the vehicle travel autonomously comprising:
    a 6-axis inertial measurement sensor installed in the vehicle to detect a forward-backward acceleration, a lateral acceleration, a vertical acceleration, a roll rate, a pitch rate, and a yaw rate of the vehicle;
    a 3-axis inertial measurement sensor that detects the forward-backward acceleration, the lateral acceleration, and the yaw rate;
    a wheel speed sensor that measures a wheel speed of a wheel provided on the vehicle; and
    a control device including a vehicle state estimation unit for estimating a vehicle state based on measured values acquired by a 6-axis inertial measurement sensor, an abnormality determination unit for determining an abnormality of the 6-axis inertial measurement sensor, an own vehicle position estimation unit that estimates a position of the vehicle, a travel control unit that controls the vehicle to make the vehicle travel autonomously based on the vehicle state estimated by the vehicle state estimation unit and the position of the vehicle estimated by the own vehicle position estimation unit, and a state management unit that manages the autonomous traveling level of the vehicle and allows the vehicle to travel autonomously,
    wherein the vehicle state estimation unit calculates an attitude angle of the vehicle based on the measured values measured by the wheel speed sensor and the 6-axis inertial measurement sensor,
    wherein the abnormality determination unit determines that there is an abnormality in the 6-axis inertial measurement sensor or the wheel speed sensor when a difference between the attitude angle calculated by the vehicle state estimation unit and a steady-state attitude angle based on a direction of gravity calculated by using the wheel speed when the vehicle travels without slipping of the wheel becomes greater than or equal to a prescribed threshold value, and
    wherein the state management unit stops the autonomous traveling by the travel control unit and makes the vehicle transition to a manual driving state when the abnormality determination unit determines that there is an abnormality during the autonomous traveling of the vehicle.

2. The vehicle control system according to claim 1, wherein the abnormality determination unit determines that there is an abnormality in the 6-axis inertial measurement sensor or the wheel speed sensor when a difference between a roll angle calculated by the vehicle state estimation unit and a roll angle of the steady-state attitude angle is greater than or equal to a prescribed threshold value or when a difference between a pitch angle calculated by the vehicle state estimation unit and a pitch angle of the steady-state attitude angle is greater than or equal to a prescribed threshold value.

* * * * *